US011136935B2

(12) United States Patent
Albing et al.

(10) Patent No.: US 11,136,935 B2
(45) Date of Patent: Oct. 5, 2021

(54) ADAPTIVE HIGH PRESSURE FUEL PUMP SYSTEM AND METHOD FOR PREDICTING PUMPED MASS

(71) Applicant: Cummins Inc., Columbus, IN (US)

(72) Inventors: Tommy J. Albing, Columbus, IN (US); David Michael Carey, Bend, OR (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 17/046,887

(22) PCT Filed: Apr. 10, 2018

(86) PCT No.: PCT/US2018/026891
§ 371 (c)(1),
(2) Date: Oct. 12, 2020

(87) PCT Pub. No.: WO2019/199280
PCT Pub. Date: Oct. 17, 2019

(65) Prior Publication Data
US 2021/0156328 A1      May 27, 2021

(51) Int. Cl.
*F02D 41/24* (2006.01)
*F02D 1/16* (2006.01)
(Continued)

(52) U.S. Cl.
CPC ......... *F02D 41/2438* (2013.01); *F02D 1/162* (2013.01); *F02D 41/009* (2013.01);
(Continued)

(58) Field of Classification Search
CPC ........ F02D 1/162; F02D 41/009; F02D 41/22; F02D 41/24; F02D 41/2438;
(Continued)

(56) References Cited

U.S. PATENT DOCUMENTS 5,237,975 A * 8/1993 Betki .................. F02D 41/3082
123/456
5,505,180 A * 4/1996 Otterman ............ F02D 41/2464
123/497

(Continued)

OTHER PUBLICATIONS

International Search Report and Written Opinion issued by the ISA/US, Commissioner for Patents, dated Jun. 13, 2018 for International Application No. PCT/US2018/026891; 5 pages.

*Primary Examiner* — John Kwon
*Assistant Examiner* — Johnny H Hoang
(74) *Attorney, Agent, or Firm* — Faegre Drinker Biddle & Reath LLP (57) ABSTRACT

A method of adaptively predicting, during operation of a pump, a mass of fuel pumped by the pump during a pumping event to a fuel accumulator ("$Q_{pump}$") to control operation of the pump is provided, comprising: generating an adaptive model of operation of the pump, including estimating a start of pumping ("SOP") position of a plunger of the pump, estimating $Q_{pump}$, determining a converged value of the estimated SOP position, and determining a converged value of the estimated $Q_{pump}$; using the adaptive model to predict $Q_{pump}$ by inputting to the model the converged value of the estimated SOP position, a measured pressure of fuel in the fuel accumulator and a measured temperature of fuel in the fuel accumulator; and controlling operation of the pump in response to the predicted $Q_{pump}$.

20 Claims, 7 Drawing Sheets

(51) Int. Cl.
*F02D 41/00* (2006.01)
*F02D 41/22* (2006.01)
*F02M 55/02* (2006.01)
*F02M 59/02* (2006.01)

(52) U.S. Cl.
CPC ......... *F02D 41/22* (2013.01); *F02D 41/2474* (2013.01); *F02M 55/025* (2013.01); *F02M 59/022* (2013.01); *F02M 59/025* (2013.01); *F02D 2041/225* (2013.01); *F02D 2200/0602* (2013.01); *F02D 2200/0606* (2013.01); *F02D 2200/0614* (2013.01)

(58) Field of Classification Search
CPC ......... F02D 41/2474; F02D 2200/0602; F02D 2200/0606; F02D 2200/0614; F02M 55/025; F02M 59/022; F02M 59/025
USPC .......... 123/495, 497, 498, 507, 510
See application file for complete search history.

(56) References Cited

U.S. PATENT DOCUMENTS

| | | |
|---|---|---|
| 5,819,196 A | 10/1998 | Holmes et al. |
| 6,223,731 B1 | 5/2001 | Yoshiume et al. |
| 6,353,791 B1 | 3/2002 | Tuken et al. |
| 7,152,583 B2 * | 12/2006 | Abe ............ F02M 55/04 123/446 |
| 7,287,515 B2 | 10/2007 | Okamura et al. |
| 7,606,656 B2 | 10/2009 | Dolker |
| 7,874,281 B2 | 1/2011 | Delp et al. |
| 7,938,101 B2 | 5/2011 | Cinpinski et al. |
| 8,210,155 B2 | 7/2012 | Ohta et al. |
| 8,291,886 B2 | 10/2012 | Mahoney et al. |
| 8,473,147 B2 | 6/2013 | Ghoneim |
| 8,775,052 B2 | 7/2014 | Ghoneim et al. |
| 2007/0251501 A1 | 11/2007 | Sawut et al. |

* cited by examiner

ADAPTIVE HIGH PRESSURE FUEL PUMP SYSTEM AND METHOD FOR PREDICTING PUMPED MASS

CROSS-REFERENCE TO RELATED APPLICATIONS

The present application is a national phase filing of PCT/US2018/026891, filed Apr. 10, 2019 the complete disclosure of which is expressly incorporated by reference herein.

TECHNICAL FIELD

The present invention relates generally to fuel pumps and more particularly to methods and systems for adaptively modeling the operation of high pressure fuel pumps to predict pumped fuel mass for control and diagnostic applications.

BACKGROUND

In internal combustion engines, one or more fuel pumps deliver fuel to a fuel accumulator. Fuel is delivered by fuel injectors from the accumulator to cylinders of the engine for combustion to power operation of the system driven by the engine. It is desirable for a variety of reasons to accurately characterize the amount of fuel delivered by the fuel pump to the accumulator. In conventional fuel delivery systems, operation of the fuel pump is characterized periodically by shutting down the fuel pump and measuring various variables of the fuel delivery system. Such an approach is disruptive to the operation of the engine and provides inaccurate results. As such, an improved approach to predicting the amount of fuel pumped by the fuel pump during operation of the pump is needed.

SUMMARY

According to one embodiment, the present disclosure provides a method of adaptively predicting, during operation of a pump, a mass of fuel pumped by the pump during a pumping event to a fuel accumulator ("$Q_{pump}$") to control operation of the pump, comprising: generating an adaptive model of operation of the pump, including estimating a start of pumping ("SOP") position of a plunger of the pump, estimating $Q_{pump}$, determining a converged value of the estimated SOP position, and determining a converged value of the estimated $Q_{pump}$, using the adaptive model to predict $Q_{pump}$ by inputting to the model the converged value of the estimated SOP position, a measured pressure of fuel in the fuel accumulator and a measured temperature of fuel in the fuel accumulator; and controlling operation of the pump in response to the predicted $Q_{pump}$. In one aspect of this embodiment, estimating a SOP position includes: receiving raw measurements of pressure of fuel in the fuel accumulator; identifying quiet segments in the raw measurements; fitting a model to the identified quiet segments; using the fitted model to determine an output representing a propagation of the pressure of fuel in the fuel accumulator without disturbance from pumping events; and identifying a divergence between the fitted model output and the raw measurements of pressure of fuel in the fuel accumulator. In a variant of this aspect, identifying quiet segments includes filtering the raw measurements with a median filter having a length corresponding to a frequency of oscillation of the pressure of fuel in the fuel accumulator. In a further variant, the median filter is tuned to the frequency of oscillation, a sonic speed of the fuel and a geometry of the fuel accumulator. In still a further variant, identifying quiet segments further includes evaluating a derivative of the filtered raw measurements to identify segments of the derivative having approximately zero slope. In another variant, fitting a model to the identified quiet segments includes using the relationship $P=Pmean+a_1^{(-\kappa 1)}\sin(\omega_1 t+\varphi_1)+a_2 e^{(-\kappa 2)}\sin(\omega_2 t+\varphi_2)$. In another aspect of this embodiment, estimating $Q_{pump}$ includes calculating a pressure difference between a mean pressure before a pumping event and a mean pressure after a pumping event. In a variant of this aspect, estimating $Q_{pump}$ further includes converting the calculated pressure difference into mass. In another aspect, the adaptive model uses the relationship $Q_{pump}=fcam(EOP-SOP)*A*\delta(P,T)-t*L(P,T)$, wherein fcam is a table correlating positions of the plunger to a crank angle of an engine, EOP is an end of pumping position of the plunger, A is an area of the plunger, $\delta(P,T)$ is a density of fuel in the fuel accumulator, t is a duration of the pumping event, and L(P,T) is a leakage of fuel from the pump. In a variant of this aspect, (P,) is modeled by either a first order polynomial in a fuel temperature dimension or at least a second order polynomial in a fuel pressure dimension. In another variant, L(P,T) is modeled by either a first order polynomial in a fuel temperature dimension or at least a second order polynomial in a fuel pressure dimension. In another aspect, controlling operation of the pump includes adjusting one of a timing of the pumping event or a duration of the pumping event.

In another embodiment of the present disclosure, a system is provided for adaptively predicting, during operation of a pump, a mass of fuel pumped by the pump during a pumping event to a fuel accumulator ("$Q_{pump}$") to control operation of the pump, comprising: a pressure sensor positioned to measure pressure of fuel in the fuel accumulator; a temperature sensor positioned to measure temperature of fuel in the fuel accumulator; and a processor in communication with the pressure sensor to receive pressure values representing the measured pressure of the fuel in the fuel accumulator and in communication with the temperature sensor to receive temperature values representing the measured temperature of the fuel in the fuel accumulator; wherein the processor is configured to generate an adaptive model of operation of the pump by estimating a start of pumping ("SOP") position of a plunger of the pump, estimating $Q_{pump}$, determining a converged value of the estimated SOP position, and determining a converged value of the estimated ("$Q_{pump}$"), use the adaptive model to predict ("$Q_{pump}$") by inputting to the model the converged value of the estimated SOP position, a pressure value and a temperature value, and control operation of the pump in response to the predicted ("$Q_{pump}$"). In one aspect of this embodiment, the processor is configured to estimate a SOP position includes by receiving the pressure values, identifying quiet segments in the pressure values, fitting a model to the identified quiet segments, using the fitted model to determine an output representing a propagation of the pressure of fuel in the fuel accumulator without disturbance from pumping events, and identifying a divergence between the fitted model output and the pressure values. In a variant of this aspect, the processor is configured to identify the quiet segments by filtering the pressure signals with a median filter having a length corresponding to a frequency of oscillation of the pressure of fuel in the fuel accumulator. In another variant, the processor is configured to identify the quiet segments by evaluating a derivative of the filtered pressure signals to identify segments of the derivative having approximately zero slope. In another aspect, the processor is configured to estimate $Q_{pump}$ by calculating a pressure difference between a mean pressure before a pumping event and a mean pressure after a pumping event. In still another aspect, the adaptive model uses the relationship $Q_{pump}=f\text{cam}(\text{EOP}-\text{SOP})*A*\delta(P,T)-t*L(P,T)$, wherein fcam is a table correlating positions of the plunger to crank angle of an engine, EOP is an end of pumping position of the plunger, A is an area of the plunger, $\delta(P,T)$ is a density of fuel in the fuel accumulator, t is a duration of the pumping event, and $L(P,T)$ is a leakage of fuel from the pump. In a variant of this aspect, at least one of (P,) and (P,T) is modeled by either a first order polynomial in a fuel temperature dimension or at least a second order polynomial in a fuel pressure dimension. In yet another aspect, the processor is configured to control operation of the pump by adjusting one of a timing of the pumping event or a duration of the pumping event.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

While the present disclosure is amenable to various modifications and alternative forms, specific embodiments have been shown by way of example in the drawings and are described in detail below. The present disclosure, however, is not to limit the particular embodiments described. On the contrary, the present disclosure is intended to cover all modifications, equivalents, and alternatives falling within the scope of the appended claims.

DETAILED DESCRIPTION

One of ordinary skill in the art will realize that the embodiments provided can be implemented in hardware, software, firmware, and/or a combination thereof. For example, the controllers disclosed herein may form a portion of a processing subsystem including one or more computing devices having memory, processing, and communication hardware. The controllers may be a single device or a distributed device, and the functions of the controllers may be performed by hardware and/or as computer instructions on a non-transient computer readable storage medium. For example, the computer instructions or programming code in the controller (e.g., an electronic control module ("ECM")) may be implemented in any viable programming language such as C, C++, HTML, XTML, JAVA or any other viable high-level programming language, or a combination of a high-level programming language and a lower level programming language.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Figure 1:
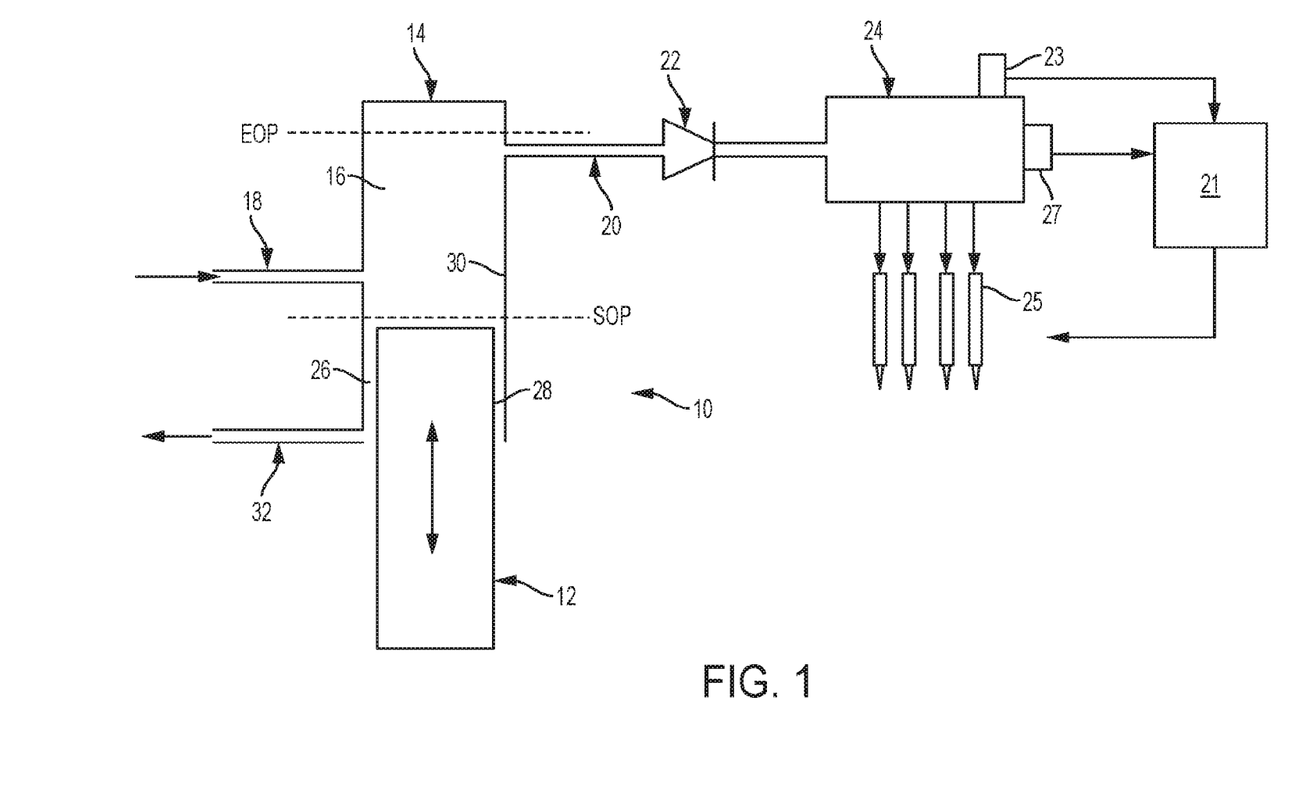
FIG. 1 is a schematic diagram of a fueling system.

Referring now to FIG. 1, a schematic diagram of a portion of a high pressure pump is shown. Pump 10 includes a plunger 12 that reciprocates within a barrel 14 as is known in the art. Fuel is supplied to a chamber 16 within barrel 14 through an inlet 18, compressed by upward motion of plunger 12 such that the pressure of the fuel is increased, and supplied through an outlet 20 to an outlet check valve (OCV) 22 and to a fuel reservoir, such as a common rail accumulator (hereinafter, rail 24). Fuel from rail 24 is periodically delivered by a plurality of fuel injectors 25 to a corresponding plurality of cylinders (not shown) of an internal combustion engine (not shown). A small circumferential gap 26 exists between an outer surface 28 of plunger 12 and an inner surface 30 of barrel 14 to permit reciprocal motion of plunger 12 within barrel 14.

As plunger 12 moves through the pumping cycle, it moves between a start-of-pumping (SOP) position and an end-of-pumping (EOP) position. The SOP position is after plunger 12 moves through its bottom-dead-center (BDC) position and the EOP position precedes the top-dead-center (TDC) position of plunger 12.

As indicated above, during the compression stroke of plunger 12 (i.e., as it moves from the BDC position to the TDC position), fuel in chamber 16 is compressed, causing the pressure in chamber 16 to increase to a point where the force on the chamber side of OCV 22 is equal to the force on the rail side of OCV 22. As a result, OCV 22 opens and fuel begins to flow through outlet 20 and OCV 22 to rail 24. Fuel continues to flow in this manner to rail 24 as plunger 12 continues to travel toward the TDC position. Consequently, the pressure of fuel in rail 24 increases. A processor 21 receives measurements of the pressure of fuel within rail 24 from a pressure sensor 23 and the temperature of fuel within rail 24 from a temperature sensor 27. Processor 21 also controls operation of injectors 25 as described herein.

The present disclosure provides a model of high pressure pump 10 that is useful for, among other things, predicting the mass of fuel pumped by pump 10 to rail 24, a prediction that provides benefits for fuel control systems as described herein. For purposes of the model, it is assumed that during the pumping operation of pump 10, fuel can only flow as supply fuel through outlet 20 and OCV 22 to rail 24 and/or as leakage through gap 26 to a return line 32 (which routes the fuel back to a fuel tank (not shown)). This characteristic of pump 10 may be described mathematically by the following equation:

$$Q_{pump}=f\text{cam}(\text{EOP}-\text{SOP})*A*\delta(P,T)-t*L(P,T) \quad (1)$$

where $Q_{pump}$ is the outputted mass to rail 24 by pump 10, fcam is a polynomial or table describing the relationship between the crank angle (in degrees) and the lift of plunger 12. More specifically, as pump 10 is coupled to the engine crankshaft through a gear assembly and is driven in operation by rotation of the crankshaft, the crank angle of the crankshaft is directly related to the position of plunger 12 of pump 10. As such, the location of SOP and EOP may be expressed in terms of crank angle. Once the SOP is determined, the swept height of plunger 12 (and therefore the swept volume of chamber 16) during a pumping cycle may be determined, given knowledge of the geometry of pump 10. The table represented by fcam may be a look-up table that is specific to a particular pump 10 and correlates crank angle to the position of plunger 12.

(EOP−SOP) describes the number of crank angle degrees between the SOP position and EOP position. The difference between the TDC position and the EOP position should be understood. The TDC position is when plunger 12 physically reaches its top position, while the EOP position is the end of the pumping stroke as observed by pressure sensor 23. As is understood by those skilled in the art, the relationship between the TDC position and the EOP position depends on the sonic speed of the fuel and the geometry of the high pressure system (i.e., rail 24).

With further reference to Equation (1) above, A is the area of plunger 12. The area A together with fcam(EOP−SOP) determines the swept volume of fuel pumped to rail 24. ($P_f$) is the density of the fuel, which can be modeled as a first order polynomial in the T (fuel temperature) dimension and a second order polynomial in the P (pressure is rail 24) dimension. The duration of the pumping stroke while OCV 22 is opened is represented by t (time). Finally, L(P,T) represents the fuel leakage (i.e., between barrel 14 and plunger 12), and can be described as a first order polynomial in the T dimension and a higher order polynomial in the P dimension. In certain embodiments, $P^{2.5}$ may be used. It should be understood that cross terms between the temperature and pressure are likely.

Given the SOP position of plunger 12 (the determination of which is described below), pressure from pressure sensor 23 and temperature from temperature sensor 27, the model can be used to predict the outputted mass of pump 10 under any set of operating conditions. While useful, the above-described model relies on known values for leakage, fuel density and the EOP position. Unfortunately, leakage varies with part-to-part variations (e.g., plunger 12 and barrel 14) and wear of the parts over time. Fuel density is different for different types and sources of fuel. Additionally, the EOP position is usually not known for a particular pump 10 on a particular engine. According to the principles of the present disclosure, the pump model may be made adaptive by estimating the unknown variables using an Extended Kalman filter.

As indicated above, rail pressure sensor 23 and rail temperature sensor 27 provide measurements of the pressure of fuel in rail 24 and the temperature of fuel in rail 24, respectively, to processor 21. In addition to these inputs, the above-mentioned adaptive pump model requires estimates for the SOP position and $Q_{pump}$. As indicated above, the SOP position may be indicated by the time of occurrence of an increase in a trace of the pressure of fuel in rail 24 (i.e., rail pressure) due to the pumping operation of pump 10. To identify the SOP position in this manner, quiet segments in a buffer of rail pressure measurements may first be determined. These quiet segments correspond to the absence of pumping fuel into or injecting fuel from rail 24. The quiet segments may be determined by processing rail pressure measurements with a median filter with a length corresponding to the period of time of the mode of operation of rail 24.

The mode of operation corresponds to the frequency or frequencies of oscillation of pressure within rail 24. There may be one or more sinusoidal modes which are accounted for by the median filter to remove the oscillations and identify when pumping and quiet segments occur. If multiple frequencies of oscillation exist, then the median filter is run multiple times with different filter lengths corresponding to the different frequencies.

Figure 2:
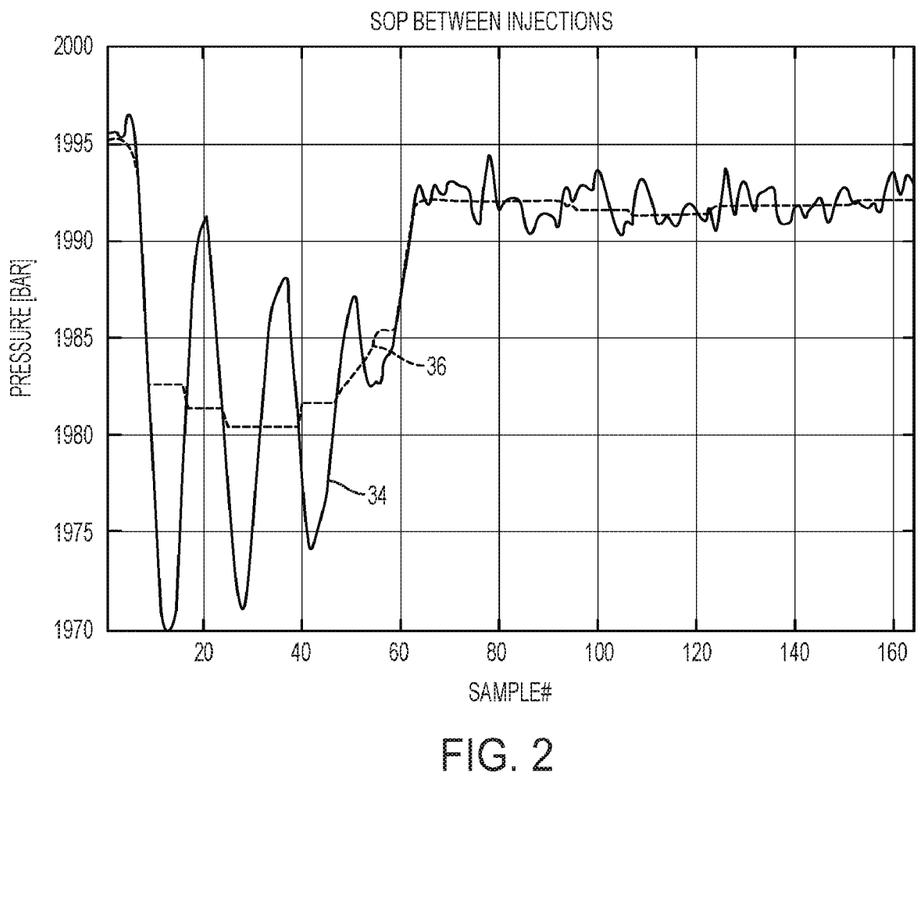
FIG. 2 is a graph showing measured rail pressure and a median filtered representation of the measured rail pressure.

Referring now to FIG. 2, raw rail pressure is shown as trace 34 and the median filtered version of trace 34 is depicted as trace 36. As shown by trace 36, the median filter effectively removes noise and oscillations from trace 34 while maintaining the injection and pumping characteristics of the raw data without losing any important high frequency information. The filter is similar to a centered moving average, but uses median pressure instead of average pressure. The filter is tuned to the frequency of oscillation predicted for a particular rail pressure, sonic speed of the fuel and geometry of rail 24.

Figure 3:
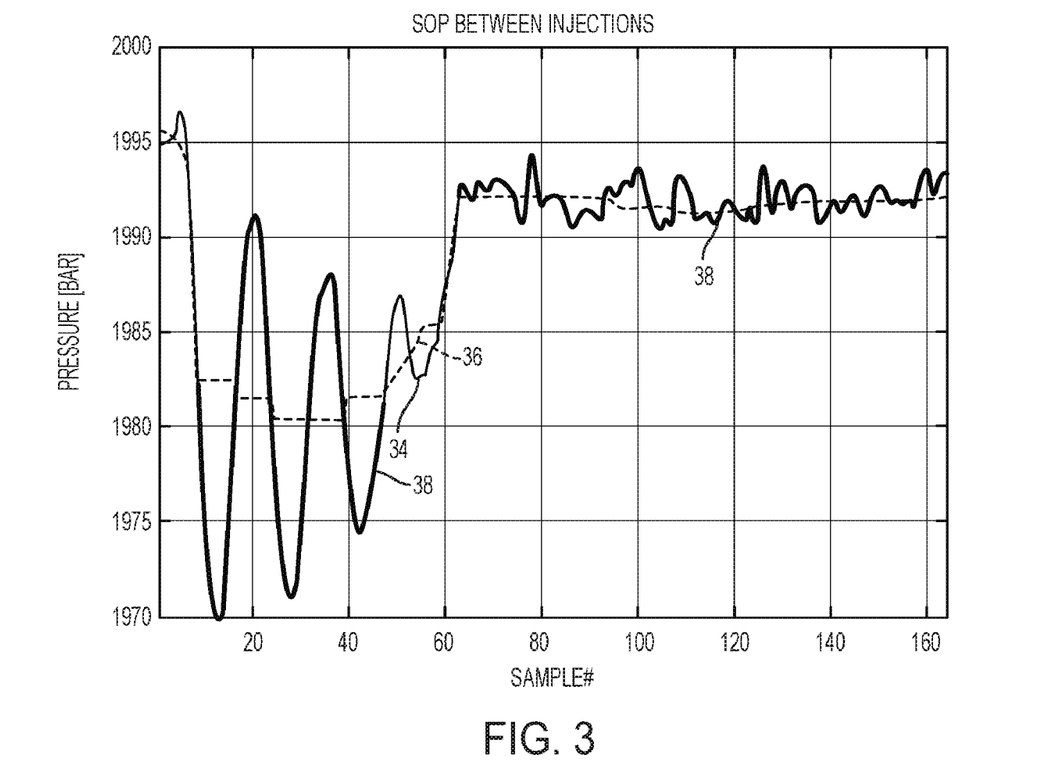
FIG. 3 is a graph similar to FIG. 2 showing quiet segments of the measured rail pressure.

Referring now to FIG. 3, processor 21 may identify quiet segments from the output of the median filter by evaluating the derivative of trace 36 (i.e., the filtered rail pressure signal). The quiet segments are highlighted as segments 38 in FIG. 3. It should be understood that quiet segments 38 are simply those portions of raw data trace 34 that correspond to horizontal or flat portions of filtered data trace 36. In other words, quite segments of raw data trace 34 correspond in time to segments of filtered data trace 36 having approximately zero slope.

According to the present disclosure, processor 21 next fits a 2-mode model to the identified quiet segments 38. The model is described by Equation (2) below.

$$P = P_{mean} + a_1 e^{(-t_{g1})}\sin(\omega_1 t + \varphi_1) + a_2 e^{(-t_{g2})}\sin(\omega_2 t + \varphi_2) \quad (2)$$

where it is assumed that damping factors gi and angular velocities $\omega_1$ (both of which depend on sonic speed) are known. As should be understood by those skilled in the art with the benefit of the present disclosure, equation (2) may be modified to include any number of modes by including additional sinusoidal terms. Equation (2) can be rewritten using trigonometric relationships as follows:

$$P = P_{mean} + a_1 e^{(-t_{g1})}\sin(\omega_1 t)\cos(\varphi_1) + a_1 e^{(-t_{g1})}\cos(\omega_1 t)\sin(\varphi_1) + a_2 e^{(-t_{g2})}\sin(\omega_2 t)\cos(\varphi_2) + a_2 e^{(-t_{g2})}\cos(\omega_2 t)\sin(\varphi_2) \quad (3)$$

Equation (3) can be further rewritten as a linear system which may be used by processor 21 to obtain a least squares estimate of Pmean, $a_1^*\cos(\varphi_1)$, $a_2^*\cos(\varphi_2)$, $a_1^*\sin(\varphi_1)$ and $a_2^*\sin(\varphi_2)$. Values for $a_i$ and $\varphi_1$ can be found by solving the linear system $$\begin{cases} a_i * \cos(\varphi_i) = x_1^i \\ a_i * \sin(\varphi_i) = x_2^i \end{cases}$$

which has the solutions $$\varphi_i = \acos\left(\frac{x_1^i}{\sqrt{x_1^{i2} + x_2^{i2}}}\right)$$

$$a1 = \sqrt{x_1^{i2} + x_2^{i2}}$$

Figure 4:
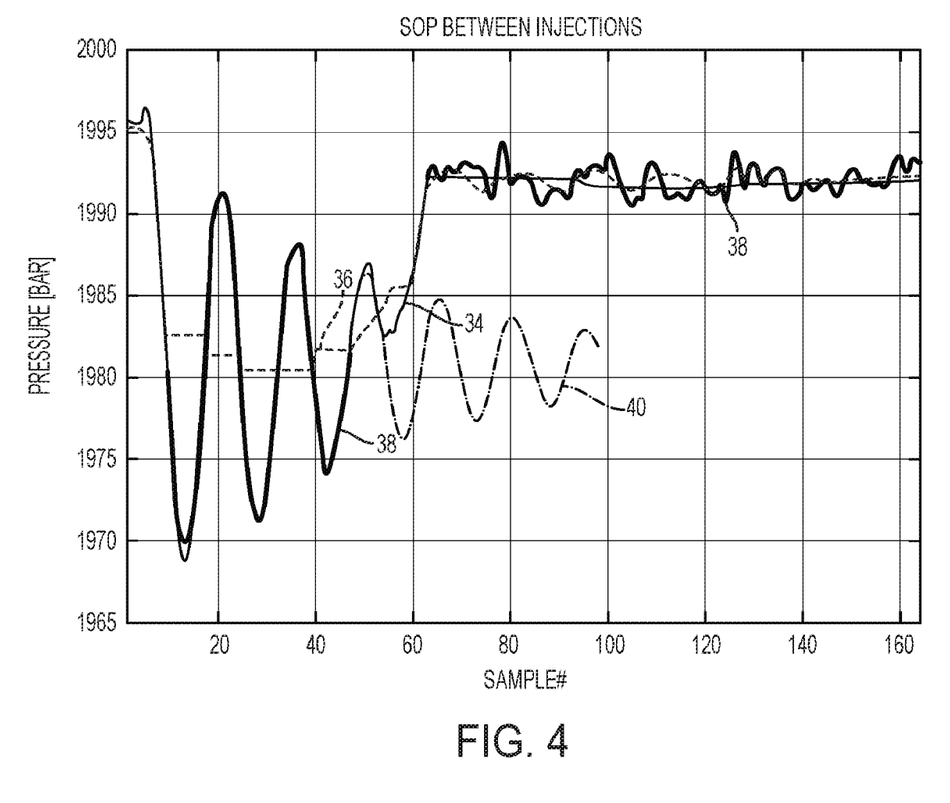
FIG. 4 is a graph similar to FIG. 3 showing an output trace of a model according to the present disclosure.

As such, the amplitude, phase, damping and frequency of the free response dynamics are known, and the propagation of the rail pressure dynamics may be represented without the disturbance of pumping events. The output of this model is plotted as trace 40 in FIG. 4 along with the data on which it is based.

Figure 5:
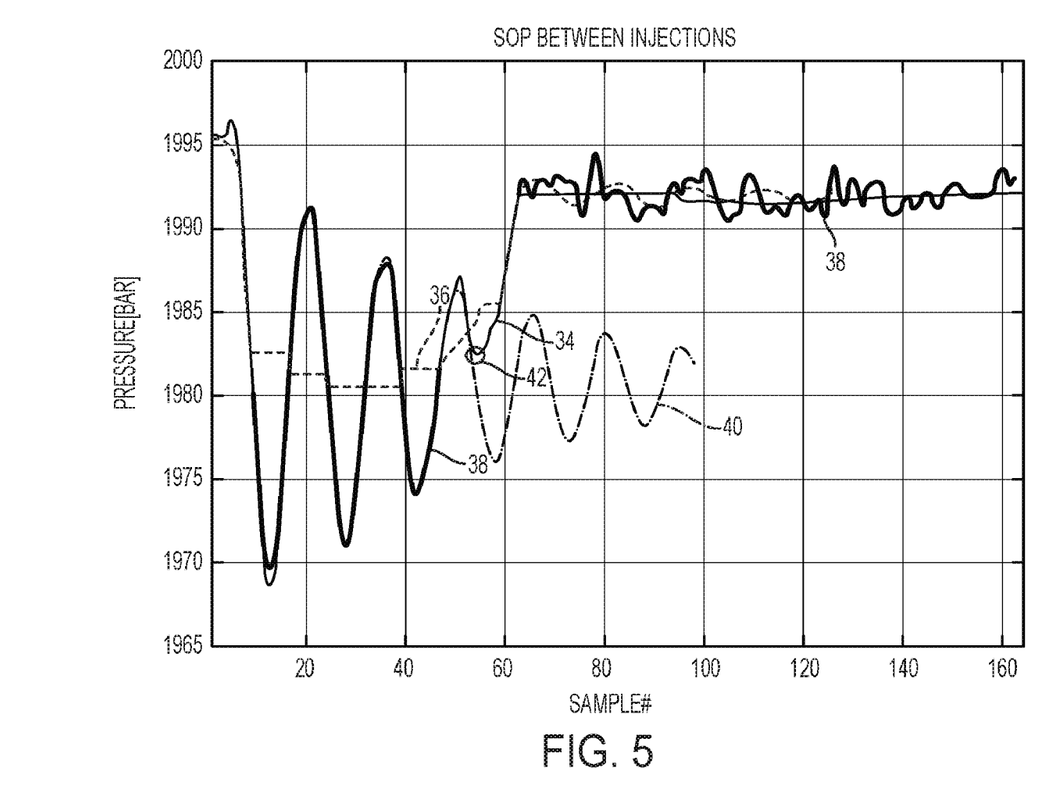
FIG. 5 is a graph similar to FIG. 4 showing an estimated start of pumping position for a fuel pump.
Figure 6:
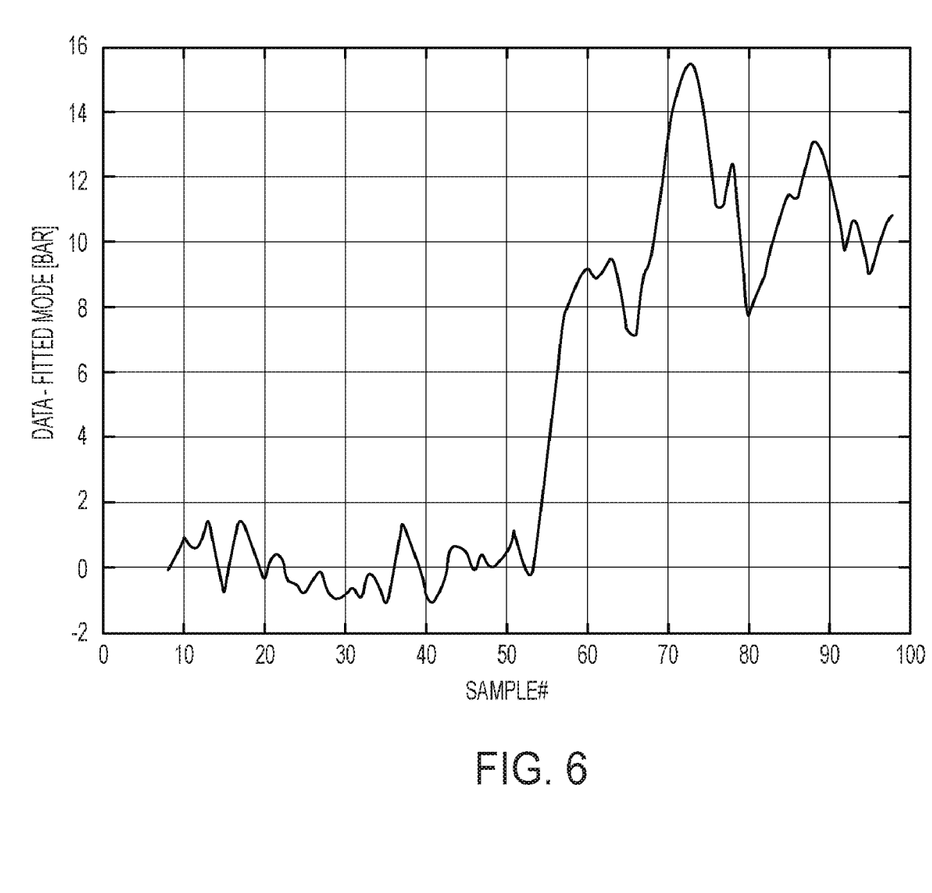
FIG. 6 is a graph of the difference between the measured rail pressure of FIG. 4 and the output trace of FIG. 4.

In the next step, the difference between the raw rail pressure data (trace 34) and the model (trace 40) can be used by processor 21 to obtain an estimation of the SOP position. Referring to FIG. 5, the estimated SOP position is indicated as dot 42. The estimated SOP position 42 is where the raw data and the fitted model diverge from one another. FIG. 6 shows the difference between the raw rail pressure data (trace 34) and the fitted model (trace 40).

Figure 7:
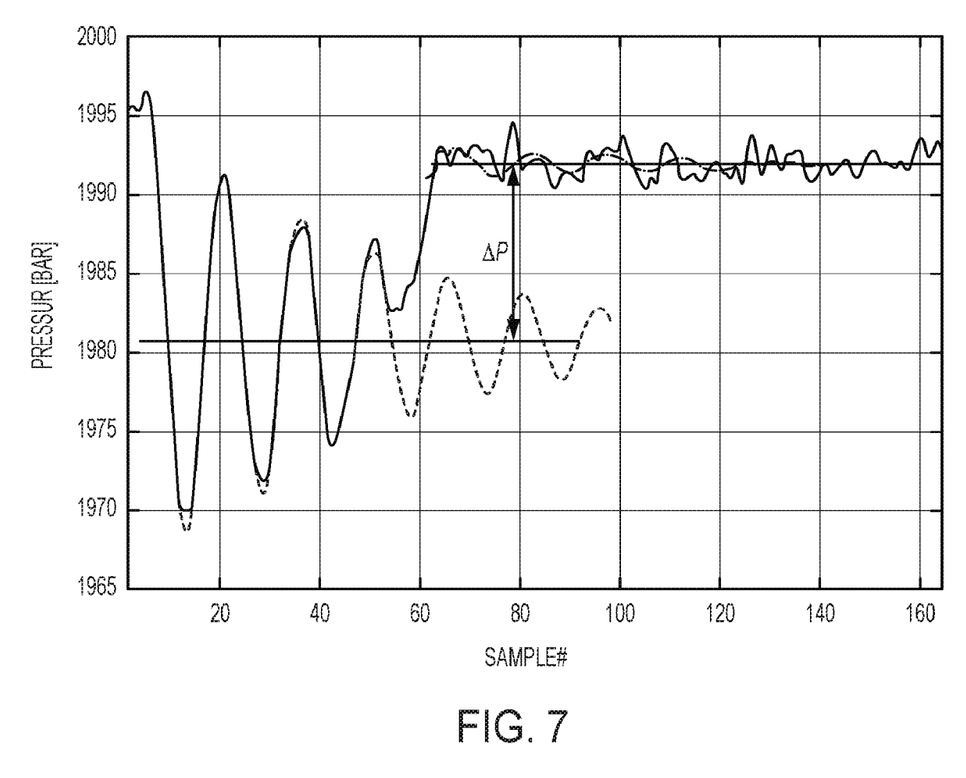
FIG. 7 is a graph showing the mean rail pressure before and after a pumping event.

The fuel mass transferred from pump 10 to rail 24 (i.e., $Q_{pump}$) may be estimated in a manner similar to conventional estimations of fuel injection quantities. $\Delta P$ is measured by pressure sensor 23, read by processor 21, and then converted to mass using knowledge of the pressurized volume and the sonic speed in the fuel. $\Delta P$ is calculated by processor 21 as the difference between the mean pressure before and after a pumping event as depicted in FIG. 7. The mean pressures are obtained using the same least squares procedure used to obtain an estimate for the SOP position (described above), where the mean pressure was one of the estimated values.

After the adaptive pump model described above converges, the pumped mass may be predicted by feeding the model with the SOP position, rail pressure and rail temperature. Using the model of the present disclosure, fuel injection measurements may be obtained without deactivating high pressure pump 10. Further details of this application of the model according to the present disclosure are described in co-pending patent application S/N PCT/US2018/026874, entitled "SYSTEM AND METHOD FOR MEASURING FUEL INJECTION DURING PUMP OPERATION," filed on Apr. 10, 2018 (hereinafter, "the Injection Measuring Application"), the entire disclosure of which being expressly incorporated herein by reference. In this sense the present disclosure provides a non-intrusive measurement method as data is gathered during normal operation. Also, the present model may be used to estimate fuel density, which can be used to determine the type of fuel (diesel, winter diesel, biodiesel, etc.) being pumped by pump 10. Additionally, the present model may be used in a feed-forward application to provide better control over the fuel pressure in rail 24. When injectors 25 inject fuel from rail 24, the fuel in rail 24 needs to be replaced to maintain mass balance in the system. As such, the timing and extent to which pump 10 is operated can be controlled according to the principles of the present disclosure to maintain mass balance as determined by the adaptive model described herein. Moreover, the model may be used to monitor fuel injection quantities, pump output, and/or leakage for diagnostic purposes.

It should be understood that the teachings of the present disclosure provide a mechanism for understanding the performance of pump 10 (e.g., the extent to which it leaks, etc.). In the Injection Measuring Application, the pump performance determined by the present application is used to determine the quantity of fuel injected by each fuel injection event, and that is used to control the fuel injectors and perform diagnostics.

Additionally, the adaptive model of the present disclosure permits computation of fuel efficiency (e.g., miles per gallon) because fuel density, injection quantities and leakage can be estimated. Moreover, as the EOP may be identified, the synchronization or timing of the pumping events relative to the fuel injection events may be determined. This information may be used to control the characteristics of the pumping events (timing and/or duration), determine if the pump was installed incorrectly, and adjust the operation of the pump to increase its operational life.

It should be understood that, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A method of adaptively predicting, during operation of a pump, a mass of fuel pumped by the pump during a pumping event to a fuel accumulator ("$Q_{pump}$") to control operation of the pump, comprising:
    generating an adaptive model of operation of the pump, including
        estimating a start of pumping ("SOP") position of a plunger of the pump,
        estimating $Q_{pump}$,
        determining a converged value of the estimated SOP position, and
        determining a converged value of the estimated $Q_{pump}$;
    using the adaptive model to predict $Q_{pump}$ by inputting to the model the converged value of the estimated SOP position, a measured pressure of fuel in the fuel accumulator and a measured temperature of fuel in the fuel accumulator; and
    controlling operation of the pump in response to the predicted $Q_{pump}$.

2. The method of claim 1, wherein estimating a SOP position includes:
    receiving raw measurements of pressure of fuel in the fuel accumulator;
    identifying quiet segments in the raw measurements;
    fitting a model to the identified quiet segments;
    using the fitted model to determine an output representing a propagation of the pressure of fuel in the fuel accumulator without disturbance from pumping events; and
    identifying a divergence between the fitted model output and the raw measurements of pressure of fuel in the fuel accumulator.

3. The method of claim 2, wherein identifying quiet segments includes filtering the raw measurements with a median filter having a length corresponding to a frequency of oscillation of the pressure of fuel in the fuel accumulator.

4. The method of claim 3, wherein the median filter is tuned to the frequency of oscillation, a sonic speed of the fuel and a geometry of the fuel accumulator.

5. The method of claim 3, wherein identifying quiet segments further includes evaluating a derivative of the filtered raw measurements to identify segments of the derivative having approximately zero slope.

6. The method of claim 2, wherein fitting a model to the identified quiet segments includes using the relationship $P=P_{mean}+a_1^{(-\kappa_1)}(\omega_1 t+\varphi_1)+a_2 e^{(-\kappa_2)}\sin(\omega_2 t+\varphi_2)$.

7. The method of claim 1, wherein estimating $Q_{pump}$ includes calculating a pressure difference between a mean pressure before a pumping event and a mean pressure after a pumping event.

8. The method of claim 7, wherein estimating $Q_{pump}$ further includes converting the calculated pressure difference into mass.

9. The method of claim 1, wherein the adaptive model uses the relationship $Q_{pump}=fcam(EOP-SOP)*A*\delta(P,T)-t*L(P,T)$, wherein fcam is a table correlating positions of the plunger to a crank angle of an engine, EOP is an end of pumping position of the plunger, A is an area of the plunger, $\delta(P,T)$ is a density of fuel in the fuel accumulator, t is a duration of the pumping event, and L(P,T) is a leakage of fuel from the pump.

10. The method of claim 9, wherein (P,) is modeled by either a first order polynomial in a fuel temperature dimension or at least a second order polynomial in a fuel pressure dimension.

11. The method of claim 9, wherein L(P,T) is modeled by either a first order polynomial in a fuel temperature dimension or at least a second order polynomial in a fuel pressure dimension.

12. The method of claim 1, wherein controlling operation of the pump includes adjusting one of a timing of the pumping event or a duration of the pumping event.

13. A system for adaptively predicting, during operation of a pump, a mass of fuel pumped by the pump during a pumping event to a fuel accumulator ("$Q_{pump}$") to control operation of the pump, comprising:
    a pressure sensor positioned to measure pressure of fuel in the fuel accumulator;
    a temperature sensor positioned to measure temperature of fuel in the fuel accumulator; and
    a processor in communication with the pressure sensor to receive pressure values representing the measured pressure of the fuel in the fuel accumulator and in communication with the temperature sensor to receive temperature values representing the measured temperature of the fuel in the fuel accumulator;
    wherein the processor is configured to
        generate an adaptive model of operation of the pump by estimating a start of pumping ("SOP") position of a plunger of the pump, estimating $Q_{pump}$, determining a converged value of the estimated SOP position, and determining a converged value of the estimated ("$Q_{pump}$"),
        use the adaptive model to predict ("$Q_{pump}$") by inputting to the model the converged value of the estimated SOP position, a pressure value and a temperature value, and
        control operation of the pump in response to the predicted ("$Q_{pump}$").

14. The system of claim 13, wherein the processor is configured to estimate a SOP position includes by receiving the pressure values, identifying quiet segments in the pressure values, fitting a model to the identified quiet segments, using the fitted model to determine an output representing a propagation of the pressure of fuel in the fuel accumulator without disturbance from pumping events, and identifying a divergence between the fitted model output and the pressure values.

15. The system of claim 14, wherein the processor is configured to identify the quiet segments by filtering the pressure signals with a median filter having a length corresponding to a frequency of oscillation of the pressure of fuel in the fuel accumulator.

16. The system of claim 15, wherein the processor is configured to identify the quiet segments by evaluating a derivative of the filtered pressure signals to identify segments of the derivative having approximately zero slope.

17. The system of claim 13, wherein the processor is configured to estimate $Q_{pump}$ by calculating a pressure difference between a mean pressure before a pumping event and a mean pressure after a pumping event.

18. The system of claim 13, wherein the adaptive model uses the relationship $Q_{pump}=fcam(EOP-SOP)*A*\delta(P,T)-t*L(P,T)$, wherein fcam is a table correlating positions of the plunger to crank angle of an engine, EOP is an end of pumping position of the plunger, A is an area of the plunger, $\delta(P,T)$ is a density of fuel in the fuel accumulator, t is a duration of the pumping event, and L(P,T) is a leakage of fuel from the pump.

19. The system of claim 18, wherein at least one of $\delta(P,T)$ and L(P,T) is modeled by either a first order polynomial in a fuel temperature dimension or at least a second order polynomial in a fuel pressure dimension.

20. The system of claim 13, wherein the processor is configured to control operation of the pump by adjusting one of a timing of the pumping event or a duration of the pumping event.

* * * * *